Dec. 1, 1964  R. T. BAYNE  3,159,786
APPARATUS FOR THE REMOTE MEASUREMENT OF CAPACITANCE
Filed Nov. 21, 1960

INVENTOR.
ROBERT T. BAYNE
BY Fulwider Mattingly & Huntley
Attorneys

United States Patent Office 3,159,786
Patented Dec. 1, 1964

3,159,786
APPARATUS FOR THE REMOTE MEASUREMENT OF CAPACITANCE
Robert T. Bayne, Santa Barbara, Calif., assignor, by mesne assignments, to Varo Inc. Electrokinetics Div., Santa Barbara, Calif., a corporation of California
Filed Nov. 21, 1960, Ser. No. 70,490
3 Claims. (Cl. 324—60)

This invention relates to test apparatus, and more particularly to a unique network for measuring desired characteristics of electrical apparatus at the remote end of a long transmission line.

In many situations, multi-wire coaxial cables of considerable length are required to connect different portions of circuits in an electrical network. Typically, one end of the cable and the circuits connected thereto are not readily accessible to permit quick checking of any circuit components.

One type of electrical component that has frustrated attempts at measurement through long transmission lines is one that exhibits capacitance. This is particularly true where the capacitance to be measured is in the neighborhood of the capacitance exhibited by the lines being utilized in the coaxial cable.

As is well known, shielded transmission lines are characterized as elements having characteristic capacitance. Where, as is usually the case, such capacitance is sizable with respect to the capacitance to be measured at the remote end of the cable, little or no reliance can be had on measurements of capacitance taken that include the capacitance of the line.

It is an object of my invention to provide unique electrical test apparatus that overcomes the above and other disadvantages of the prior art.

It is another object of my invention to provide a unique electrical test system for measuring the capacitance of an element at the remote end of a long transmission line, but without measurements being affected by the capacitance of the line.

A further object of my invention is to provide, for a capacitance connected to any pair of wires of a multi-wire coaxial cable, unique means for accurately measuring the magnitude of the capacitance.

A still further object of my invention is to provide a unique capacity checking system by which to measure the capacitance of a device at the remote end of a long transmission line, and which employs a minimum number of component parts of simple design and rugged construction.

The above and other objects and advantages of my invention will become apparent from the following description taken in conjunction with the accompanying drawing of an illustrative embodiment thereof, in which:

FIGURE 1 is a combined circuit and block diagram of the test system of my invention, showing a square-wave generator arranged to transmit locally generated waves along one line of a shielded cable to capacitance under test, and showing means for developing a D.-C. voltage corresponding to the charge variations and transmitting such D.-C. voltage back through the cable along another line to an indicator;

Figure 1:
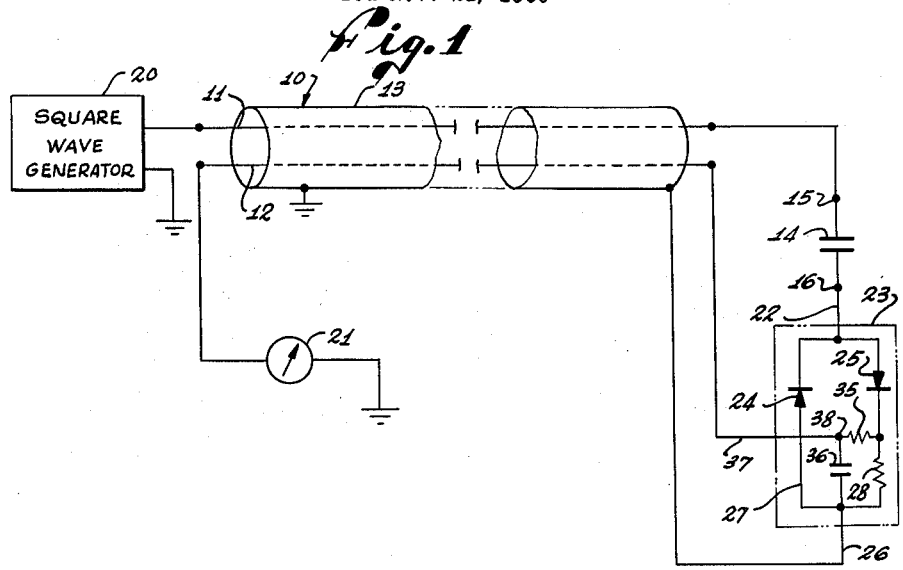

Referring to FIGURE 1, a coaxial cable indicated at 10 is shown to have a pair of wires 11, 12 extending along its length, the wires 11, 12 being surrounded by a shield 13 which is connected to a point of reference or ground potential. As is well known, each of the lines 11, 12 is characterized by capacitance between the line and the shield.

The capacitance to be checked is illustrated as a capacitor 14 having terminals 15, 16. The capacitor 14 may, for example, comprise the contact plates of a crystal, wherein a predetermined capacitance exists between the plates when the crystal is in good working order, but wherein the capacitance is markedly different if there is anything wrong with the crystal, e.g., where the crystal body is fractured.

In accordance with my invention, a cyclical signal is passed through the cable to the capacitor, and a D.-C. voltage is developed and returned through the cable to an indicator. The D.-C. voltage, and hence the position of the indicator, corresponds to the charge built up on the capacitor during each cycle of the signal applied thereto. By suitably calibrating the indicator, capacitance readings are obtained directly.

In the circuit of FIGURE 1, the above-described operations are obtained through the use of a square-wave generator 20 that is coupled to one of the lines 11. At the same end of the cable 10, the line 12 is connected to an indicator 21, which for example may be a vacuum-tube voltmeter.

At the remote end of the cable 10, the line 11 is directly connected to one of the terminals 15 of the capacitor 14. The terminal 16 is connected to an input lead 22 of a charge sensing unit 23. Within the sensing unit 23, a pair of diodes 24, 25 are connected in back-to-back relation to the lead 22. The unit 23 is provided with a ground lead 26 which, as shown, is connected to the grounded shield 13 of the cable 10. Within the unit 23, a direct connection 27 is made between the ground lead 26 and one of the diodes 24, and a resistive connection, indicated by a resistor 28, is provided between the ground lead 26 and the other diode 25.

Figure 2A:
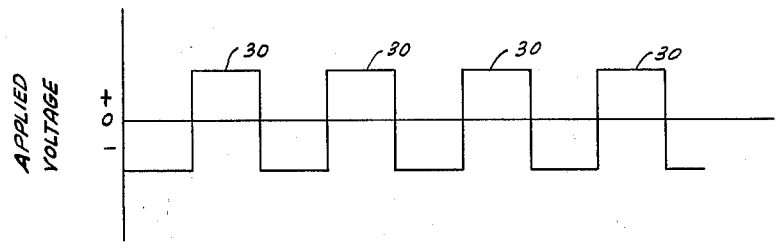
FIGURE 2a is a plot of the square wave voltage developed by the square-wave generator of FIGURE 1.

In FIGURE 2a, the square wave voltage 30 represents the output of the square-wave generator 20. In the circuit arrangement thus far described, the capacitor 14 is alternately charged and discharged in response to the cyclical square wave from the generator 20. In this connection, the generator 20 preferably is one with sufficient power that the square wave voltage is substantially the same in magnitude at the remote end of the cable 10 as at the output of the generator.

Figure 2B:
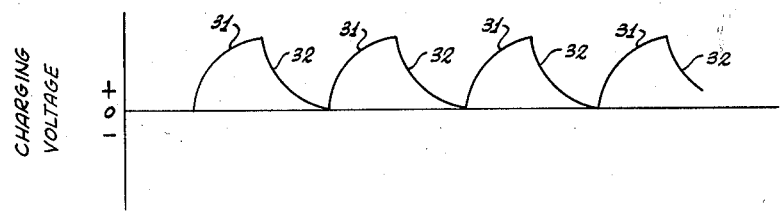
FIGURE 2b is a plot of the charge voltage developed across the capacitance under test in the network of FIGURE 1.

Referring to FIGURE 2b along with FIGURE 1, the capacitor 14 is charged during the positive half-cycles of the square wave 30, as indicated at 31 in FIGURE 2b. During the negative half-cycles of the square wave 30, the capacitor 14 is discharged, as indicated at 32 in FIGURE 2b.

Figure 2C:
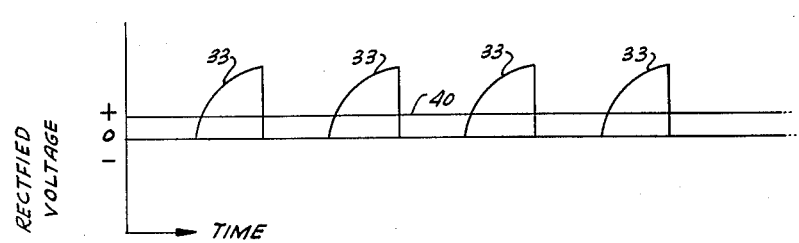
FIGURE 2c illustrates plots of the rectified voltage obtained from the charging voltage of FIGURE 2b, and of the D.-C. voltage obtained from such rectified voltage.

However, due to the arrangement of the diodes 24, 25 and the resistor 28, voltages are developed across the resistor 28 only during the charging portions. FIGURE 2c illustrates waveforms 33 depicting the operation wherein voltage excursions build up across the resistor 28 during the half-cycles while the capacitor 14 is charged, and falls to zero during the discharge portions of the applied square wave.

To further aid in understanding the operation of the circuit of my invention, attention is directed to the arrangement of the diodes 24, 25. In the circuit illustrated, the diode 24 is connected in the forward direction between the ground lead 26 and the input lead 22, and the diode 25 is connected in the forward direction between the input lead 22 and the resistor 28. Upon examination of this arrangement, it will be seen that during the positive half-cycles of the square wave, the diode 25 is conductive and the diode 24 is nonconductive. Accordingly, current flows through the resistor 28 during the positive half-cycles of the square wave 30, whereby a voltage develops across the resistor 28 that follows the charging curve.

During the negative half-cycles of the square wave 30, the diode 25 is cut off and the diode 24 is rendered conductive. Conduction of the diode 24 effectively provides a direct connection between the capacitor 14 and ground, so that the resistor 28 is bypassed, and the voltage across the resistor 28 drops to zero.

In accordance with my invention, the period of the square wave 30 is such that, during each cycle thereof, the capacitor 14 is fully charged and discharged. Thus, and referring to FIGURE 2c along with FIGURE 1, the voltages 33 developed across the resistor 28 during each positive half-cycle of the square wave accurately correspond to the capacitance of the capacitor. With this criterion, different capacitors will charge to different levels, so that voltages developed across the resistor 28 accurately reflect their capacitance.

The circuit of my invention responds to the higher voltages developed across the resistor 28 to develop a D.-C. voltage and return it through the cable 10 to the indicator 21. To this end, the sensing unit 23 is provided with a filter that in one form comprises a resistor 35 and a capacitor 36 connected across the resistor 28. A filter connecting lead 37 that is accessible from the exterior of the unit 23 is connected directly to the junction 38 of the resistor 35 and capacitor 36.

Referring to FIGURE 2c along with FIGURE 1, the filter 35, 36 responds to the pulsating voltages 33 that are developed across the resistor 28, and derives a steady-state or D.-C. voltage 40 that is of a magnitude corresponding to the average value of the pulsating voltages 33. The lead 37 is connected to the line 12 of the cable 10, whereby to cause the indicator 21 to provide an indication corresponding to the magnitude of the D.-C. voltage 40.

In this latter connection, it should be noted that the D.-C. voltage passing through the line 12 will not be affected by the capacitance of the line. Hence, the indicator 21 provides an accurate indication of the D.-C. voltage 40, and is therefore a direct indication of the capacitance being measured.

Although I have illustrated and described a particular embodiment of my invention, it will be apparent that various modifications can be made therein without departing from the spirit and scope of my invention. As will be apparent, the circuit of my invention is not limited to use with a two-wire coaxial cable, but is readily usable with a cable with any greater number of wires or lines, it being sufficient merely to utilize any pair for the desired measurements. Also, my invention embraces the use of my unique circuit for checking other characteristics, e.g., the continuity of the lines; as will be apparent, if a line is broken, this fact will be indicated by the absence of a reading on the indicator. Accordingly, I do not intend that my invention be limited, except as by the appended claims.

I claim:

1. Measuring apparatus for obtaining information at one end of a multi-wave cable from the characteristic capacitance of a device connected to the remote end of the cable, comprising: a shielded multi-wire cable, means connected to one wire of the cable at said one end for generating a cyclical voltage wave to be passed through said one wire to the remote end of the cable; means at said remote end connected in circuit with the device between said one wire and another wire for developing from the cyclical voltage a D.-C. voltage varying as a function of the characteristic capacitance to be measured; and means connected to said other wire at said one end to provide an indication of the magnitude of the D.-C. voltage and of the characteristic capacitance of the device, wherein said capacitance is charged a predetermined amount during each cycle of the cyclical wave, wherein the cyclical voltage generating means possesses sufficient output power to maintain a cyclical voltage of substantially the same magnitude at the remote end of the cable as at the output of the cyclical voltage generating means, and wherein said D.-C. voltage developing means includes resistive means; means including two parallel circuits connected to a common junction with the capacitance, each parallel circuit having a rectifier, with the rectifiers oppositely poled, and with one of the rectifiers in series with the resistive means to establish a voltage across said resistive means only during charging of said capacitance; and filter means connected across the resistive means to develop a D.C. voltage in response to the pulsating voltages across said resistive means.

2. In an apparatus for testing capacitance of a device at a remote location, the combination of:
 a length of cable having first, second and third conductors;
 a charging voltage source connected across said first and third conductors at one end of said cable, said source generating a cyclical square wave voltage;
 a high impedance D.-C. voltage measuring device connected across said second and third conductors at said one end;
 a charge sensing unit connected in series with the device under test across said first and third conductors at the other end of said cable, said charge sensing unit including parallel circuits with oppositely poled rectifiers therein for charging the device through one circuit and discharging through the other circuit, with a resistor connected in series with one of said rectifiers at a junction point;
 and a smoothing filter connected between said junction point and said third conductor, with the filter output connected to said second conductor at said other end of said cable.

3. In an apparatus for testing capacitance of a device at a remote location, the combination of:
 a length of cable having a shield and first and second conductors, with said shield connected to circuit ground;
 a charging voltage connected across said shield and first conductor at one end of said cable, said source generating a cyclical square wave voltage of a magnitude to produce substantially the same signal at each end of said cable;
 a high impedance D.-C. voltage measuring device connected across said shield and second conductor at said one end;
 a charge sensing unit connected in series with the device under test across said shield and first conductor at the other end of said cable, said charge sensing unit including parallel circuits with oppositely poled rectifiers therein for charging the capacitor through one circuit and discharging through the other circuit, with a resistor connected in series with one of said rectifiers at a junction point;
and a smoothing filter connected between said junction point and said shield, with the filter output connected to said second conductor at said other end of said cable.

References Cited by the Examiner

UNITED STATES PATENTS

| | | | |
|---|---|---|---|
| 2,455,543 | 12/48 | Williams | 324—60 |
| 2,575,492 | 11/51 | Dittmann | 324—61 X |
| 2,655,043 | 10/53 | Wolfe et al. | 324—61 |
| 2,741,741 | 4/56 | Adams | 324—60 X |
| 2,766,428 | 10/56 | Sippach | 324—61 |
| 2,774,959 | 12/56 | Edelman et al. | 324—61 |

FOREIGN PATENTS 701,862  1/54  Great Britain.

WALTER L. CARLSON, *Primary Examiner.*

SAMUEL BERNSTEIN, *Examiner.*